Nov. 28, 1939.  C. G. STRANDLUND  2,181,410
PLOW
Filed March 19, 1938  2 Sheets-Sheet 1
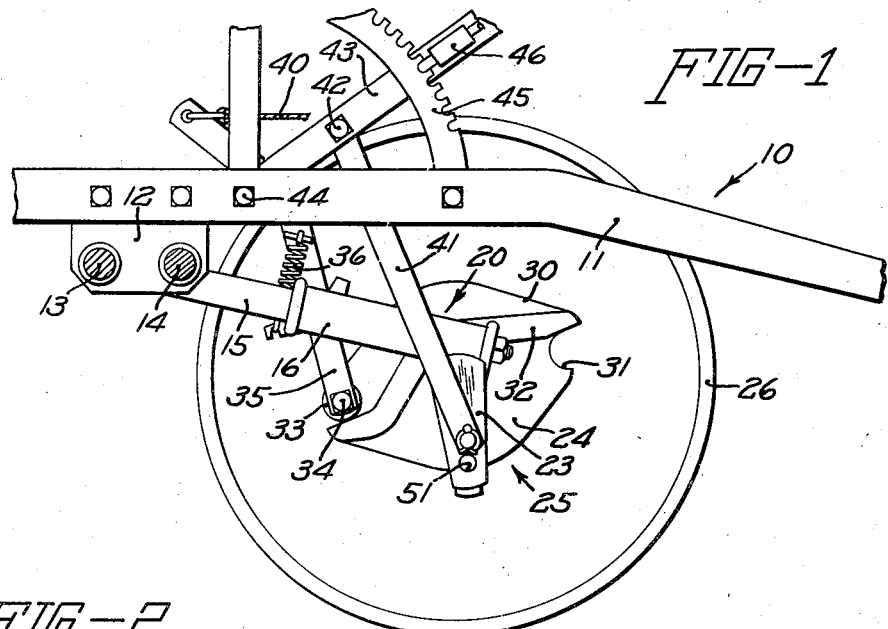
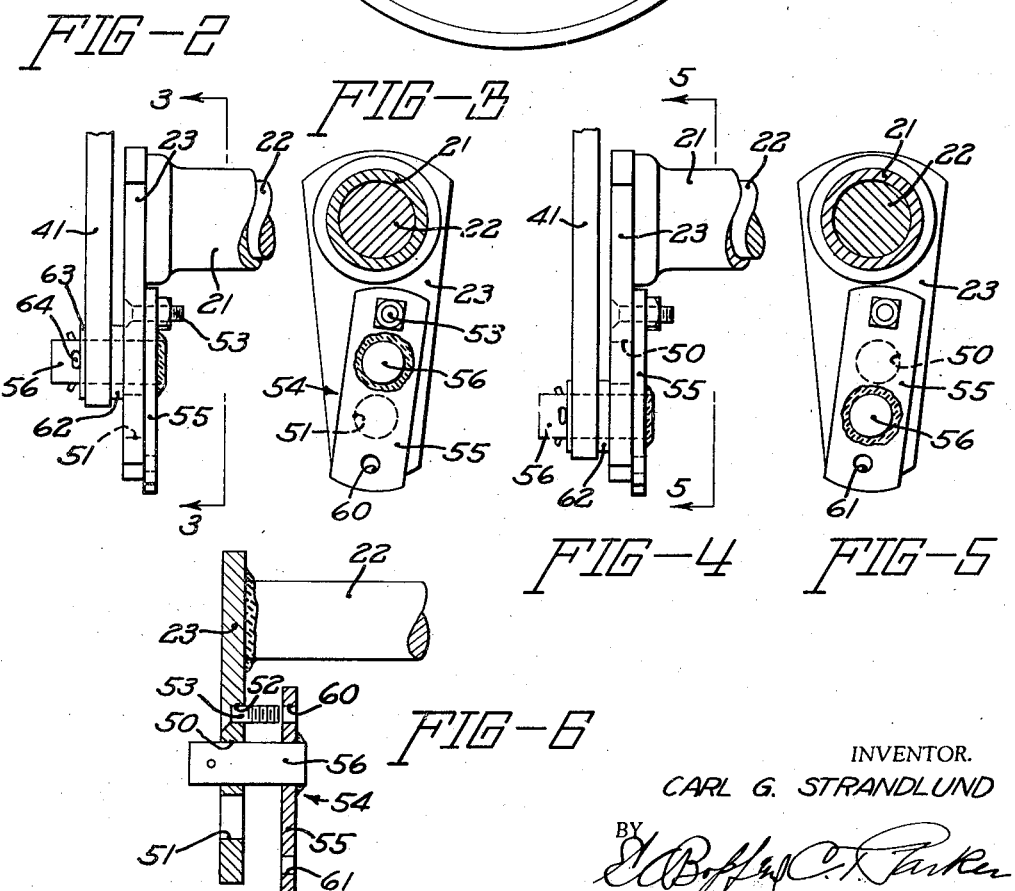
INVENTOR.
CARL G. STRANDLUND
ATTORNEYS

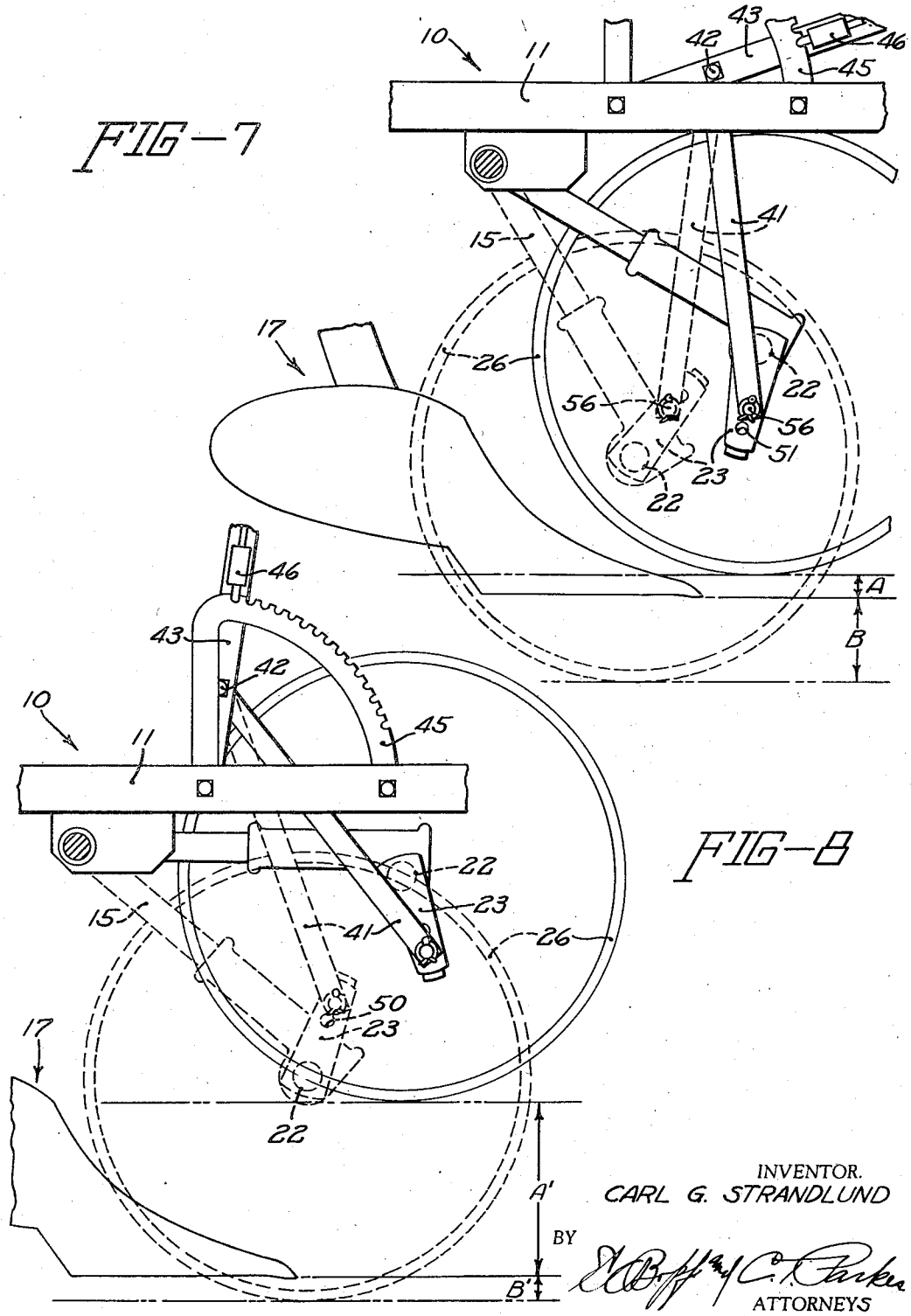

Patented Nov. 28, 1939

2,181,410

UNITED STATES PATENT OFFICE 2,181,410

PLOW

Carl G. Strandlund, Moline, Ill., assignor to Deere & Company, Moline, Ill., a corporation of Illinois Application March 19, 1938, Serial No. 196,827

9 Claims. (Cl. 97—73)

The present invention relates generally to farm implements and is more particularly concerned with wheel supported plows of the type which are raised and lowered between plowing and transport positions by means of a traction operated lifting clutch usually associated with one of the wheels.

The conventional plow in common use today comprises a tool carrying frame which is supported on a pair of laterally spaced ground wheels by means of forwardly extending, vertically swingable crank axles. One of the wheels is provided with self-interrupting clutch mechanism including a crank arm which is normally held rigidly in one of two positions spaced 180 degrees apart and is rotated therebetween by operation of the clutch. Connecting the crank arm with an adjusting hand lever on the frame is a link which transmits the lifting force exerted by the clutch to the frame to raise the latter. The adjusting hand lever is pivotally connected to the frame for vertical swinging to regulate the working depth of the plow bottom by raising or lowering the frame on the supporting wheels. The lever is generally locked in adjusted position by means of a notched sector and cooperating latch mechanism.

Heretofore, a wider range of plowing depths has been secured by providing an adjustable connection between the connecting link and depth adjusting lever comprising two or more holes spaced along the end of said link through which a pivot bolt connecting the link to the adjusting lever could be passed. Moving the pivot bolt from one hole to another served to shorten or lengthen the connecting link, thereby moving the frame upwardly or downwardly relative to the wheels for any fixed position of the depth adjusting lever.

Thus, when it was desired to plow to the maximum depth, the depth adjusting lever was swung upwardly to the extreme upper notch in the sector and the connecting link shortened by connecting said link to the adjusting lever with the pivot bolt passed through the inner hole in the link. Likewise, for shallowest plowing, the depth adjusting lever was swung downwardly to the extreme lower notch in the sector and the connecting link lengthened by using the outer hole for the pivot bolt. The net result in the case of the deep plowing setting was to lower the frame to the lowest possible position relative to the supporting wheel with the lifting crank in the down position. Similarly, with the shallow plowing setting, the result was to raise the frame to the highest possible position relative to the wheels with the lifting crank in the down position.

The shortest length of the connecting link must yet be long enough to enable the lifting clutch to raise the plow bottom from its deepest plowing depth to a transport position having ample ground clearance under the share. At the same time, the longest length of the connecting link must be sufficient to hold the implement frame high enough, with the lifting crank down, so that the plow share barely penetrates the surface of the ground for extremely shallow plowing. As the frame is raised relative to the wheels, the angle defined between the forwardly and downwardly extending crank axles and supporting frame members becomes greater and with the implement set for shallowest plowing using a connecting link long enough to fill the above requirements, the crank axle is swung downwardly and rearwardly in transport position to a critical angle approaching the vertical at which the forces opposing the subsequent forward swinging of the crank axles to lower the frame very nearly equal the tractive force transmitted to the wheels to operate the traction operated lifting clutch. The result is a tendency on the part of the frame to hesitate before dropping when the clutch is tripped and at times causing the wheel to skid along the ground, especially in soft or trashy ground conditions.

With the above in view, it is the principal object of the present invention to provide improved link means connecting the plow clutch and implement frame in which the widest practical range of plowing depths within the lifting range of the plow clutch is secured, while at the same time limiting the angle between the crank axles and the ground to a value appreciably less than the aforementioned critical angle, when the plow is in transport position with the implement adjusted for shallowest plowing. Whereas the old way of increasing the range of plowing depths was to shorten or lengthen the connecting link thereby moving the terminal positions of the crank axles up or down, the present invention contemplates providing means for shortening or lengthening the effective length of the lifting crank arm to accomplish the same end. In plowing position, with the lifting crank down, the effect of shortening the crank arm is equivalent to lengthening the connecting link, while in transport position with the lifting crank up, the effect of shortening the crank arm is equivalent to shortening the connecting link. As set forth previously, lengthening the connecting link is the means for raising the frame to the highest possible position relative to the wheel, with the lifting crank down, to secure the shallowest possible plowing. Consequently, the shorter lifting crank arm, being equivalent to a longer connecting link, acts in the same capacity to provide an extremely shallow plowing depth. However, when the lifting crank is swung upwardly, the shorter crank arm, being now equivalent to a shorter connecting link, raises the frame to a transport height considerably lower than would have been the case with the longer connecting link, with a correspondingly smaller angle between the crank axles and the ground, thus avoiding any difficulty in lowering the plow in soft or trashy soil conditions.

A more specific object of the present invention is to provide means for varying the effective length, or moment arm of the lifting crank. In the accomplishment of this object I prefer to provide two or more holes spaced along the length of the lifting arm through either of which may be passed the pin connecting the link and lifting arm.

Still another object has to do with the provision of replaceable means for interchangeably connecting the link to the crank at either position on the latter. Heretofore it has been customary to connect the link to the crank arm either by means of a pin bolt passed through aligned holes in both members or by providing a stub shaft fixed to one of the members and upon which the other member is journaled. In the first instance there is always the possibility of the pin bolt working loose, while in the second instance the rapid wear on both the stub shaft and bearing hole caused by the heavy stresses imposed in lifting the weight of the implement together with the abrasion due to dust and soil getting into the bearing surfaces, necessitates frequent replacement of both the link and crank arm. Where the crank arm is an integral part of the clutch, the replacement of the crank arm may involve considerable expense and inconvenience, and it is with this in view that I have provided a simple, inexpensive, replaceable link comprising a bearing stud which is welded or otherwise fixed perpendicular to a base plate and which is adapted to be passed through either of the two holes in the crank arm while the base plate is bolted to the crank arm. In this type of construction the two holes in the crank arm serve primarily as guide holes to locate and hold the reversible bearing stud in place and there is little possibility of the parts becoming loose.

These and other objects and advantages of the present invention will become apparent after a consideration of the following preferred structural embodiment thereof, reference being had to the appended drawings, in which:

Figure 1 is a side view of a portion of the frame and lifting mechanism of a plow embodying the principles of the present invention;

Figure 2 is a detail view, drawn to enlarged scale, of the clutch lifting arm and connecting link, showing the replaceable link positioned with the bearing stud located in the hole nearest to the axis of rotation of the crank arm;

Figure 3 is a view taken along the line 3—3 of Figure 2;

Figure 4 is a detail view similar to Figure 2 but showing the replaceable link positioned with the bearing stud located in the hole farthest from the axis of rotation of the crank arm;

Figure 5 is a view taken along the line 5—5 of Figure 4;

Figure 6 is a sectional view of the crank arm and replaceable link, taken along a line through the centers of the two locating holes in the crank arm, with the link partly withdrawn;

Figure 7 is a diagrammatic drawing of the implement illustrated in Figure 1 with the plow bottom included and with the adjusting hand lever set for shallowest plowing and the connecting link attached to the lifting arm at the inner point of connection; showing in solid lines the relation of the various parts in plowing position and in dotted lines the same parts in transport position; and Figure 8 is a similar diagrammatic drawing with the adjusting hand lever set for deepest plowing and the connecting link attached to the lifting arm at the outer point of connection; showing in solid lines the relation of the various parts in plowing position and in dotted lines the same parts in transport position.

Referring now to the drawings, the implement frame, indicated generally by the reference numeral 10, includes a longitudinally extending beam 11, the front end of which is provided with suitable draft means (not shown) for hitching the implement to a source of tractive power, and the rear end of which is adapted to carry, in any suitable manner, one or more plow bottoms 17 (see Figs. 7 and 8). Bolted to the beam 11 is a supporting bracket 12, and journaled in suitable bearings in the latter are the transverse portions 13 and 14 of the left and right crank axles, respectively. Fixed on the front end of the forwardly extending arm 15 of the left crank axle is the socket portion 16 of an axle housing 20, the front end of which is provided with a transversely extending tubular portion 21 disposed generally below the center of the socket portion 16. Journaled within the tube 21 is a normally non-rotating shaft 22, the inner end of which projects a very short distance beyond the end of the tube 21 and to which the lifting arm 23 is fixed, as by welding. The outer end of the shaft 22 projects a substantial distance beyond the end of the tube 21, and fixed to the shaft in any suitable manner adjacent the end of the tube is the driven member 24 of a clutch 25, to be described in more detail shortly. The hub of the left or land wheel 26 is journaled on the portion of the shaft 22 projecting beyond the clutch driven member 24.

The clutch 25 is of the conventional self-interrupting, half-revolution type, well known in the art and therefore described only briefly herein. In general, the clutch 25 comprises a driving member (not shown) which is fixedly connected to the wheel 26; a driven member 24 fixed to the normally non-rotating shaft 22 and having a radially extending flange 30 in which are formed two notches or recesses 31 spaced at 180° to each other; and means for optionally engaging and automatically disengaging the driving and driven clutch members after a half revolution together. The last named means includes suitable mechanism carried on the clutch driven member 24 for locking the driving and driven members together and is actuated by a lever arm 32 which is pivotally connected to the driven member 24 with its ends positioned adjacent the sockets 31. A roller 33 which is normally seated in one or the other of the sockets 31 bears against the spring biased lever arm 32, disabling the locking mechanism until the roller is lifted out of its seat in the notch, at which time the clutch is engaged causing the driven member 24 and lifting arm 23 to rotate through 180°. As the succeeding socket 31 comes around into position, the roller 33 drops into seating engagement with it, thereby disabling the locking mechanism once more. The roller 33 is journaled on a pin bolt 34 at the end of a trip lever 35 and the latter is pivotally supported on the socket portion 16 of the axle housing 20. A tension spring 36, which is connected at one end to the socket 16 and at the other end to the trip lever 35, acts to hold the roller 33 against the flange 30 under tension. A trip rope 40 fastened to the end of the trip lever 35 extends forwardly to within reach of the operator and provides means for initiating the operation of the clutch 25 by a forward pull on the rope 40, which lifts the roller 33 out of its socket.

The lifting force exerted by the clutch 25 is transmitted to the frame 10 by means of an upwardly extending link 41, the lower end of which is journaled on a crank on the lifting arm 23 in a manner to be described in more detail shortly. The upper end of the link 41 is pivotally connected by a pivot bolt 42 to a depth adjusting lever 43, and the latter is pivotally connected by a transverse pivot bolt 44 to the frame beam 11 adjacent the bracket 12. The function of the depth adjusting lever 43 is, as its name implies, to regulate the depth at which the plow bottom 17 operates and this is accomplished by swinging the lever up or down to raise or lower the frame relative to the wheels. When the desired depth has been secured, the lever 43 is locked in position with a notched sector 45 which is fixed to the beam 11 by means of the usual cooperating latch mechanism 46.

Coming now to that portion of the implement with which the present invention is more directly concerned, the lifting arm 23 is provided with two circular apertures 50 and 51 which are spaced along the length of the arm and the centers of which lie on a line passing to one side of the axis of rotation of the lifting arm 23. The purpose of this offset is to maintain the same angular relationship between lines drawn through the centers of aperture 50, pivot bolt 42, and the axis of rotation of the lifting arm 23 as is obtained between lines drawn through the centers of aperture 51, pivot bolt 42, and the axis of rotation of the lifting arm 23. This relationship is important to the best operation of the lifting clutch under all conditions. Disposed between the axis of rotation of the lifting arm 23 and aperture 50 and in alignment with apertures 50 and 51 is a countersunk bolt hole 52 which is adapted to receive a bolt 53, as best shown in Figure 6.

Link 41 is connected to the lifting arm 23 through the agency of another link 54, the latter comprising a generally rectangular base plate 55 having a bearing stud 56 fixed perpendicular thereto. In the preferred construction illustrated herein, the bearing stud 56 is passed through an aperture in the base plate 55 and welded to the back side thereof. This provides a very strong connection and at the same time eliminates any surface irregularities on the side of the base plate which is clamped against the lifting arm. The base plate 55 is perforated on opposite sides of the bearing stud 56 to provide two bolt holes 60 and 61 of the same size as bolt hole 52 and spaced along the base plate 55 in such manner that when the bearing stud 56 is located in aperture 50, bolt hole 60 registers with bolt hole 52 and the bolt 53 can be passed through the aligned holes and secured. Likewise, when the bearing stud 56 is located in aperture 51, bolt hole 61 registers with bolt hole 52. The end of link 41 is apertured to receive the bearing stud 56 and is journaled thereon with a spacing washer 62 interposed between the link 41 and lifting arm 23. The link 41 is held on the bearing stud by a retaining washer 63 and cotter pin 64.

The operation and advantages of the present invention are well illustrated in Figures 7 and 8. In Figure 7, the plow has been set for shallowest plowing, with the depth adjusting lever 43 set in the bottom notch on the sector 45 and the bearing stud 56 located in aperture 50 to give the shorter length lifting arm. The distance A represents the distance below the surface of the ground of the plow share in plowing position, while B represents the distance above the surface of the ground of the plow share in transport position. It is self-evident in the dotted line representation that the crank axle 15 is at an angle considerably less than 90° relative to the ground, and that the weight of the frame 10 will assist the clutch mechanism to swing the wheel 26 forwardly, causing the implement to drop down into plowing position when the clutch is tripped. The advantage of this construction over one of the conventional type in which the length of the link 41 is adjustable rather than the length of the arm 23, is apparent in this drawing, for if the link 41 were long enough to reach from the pivot bolt 42 down to the lower hole 51 in plowing position (solid lines), the crank axle when in transport position would necessarily be much nearer to a vertical position than is shown in dotted lines.

In Figure 8 the plow has been set for deepest plowing, with the depth adjusting lever 43 set in the top notch on the sector 45 and the bearing stud 56 located in aperture 51 to give the longer length of lifting arm. The distance A' represents the distance below the surface of the ground of the plow share in plowing position, while B' represents the clearance of the share in transport position. Here is seen the ability of the lifting mechanism and connecting linkage to lift the plow bottom from the deepest plowing position to a transport position clear of the ground.

What I claim as my invention is:

1. An implement comprising, in combination, a main frame and a wheel carrying frame connected to said main frame for vertical swinging, lifting mechanism carried on one of said frames and including a lifting crank, a bearing stud, means for adjustably attaching said stud to said crank at various positions thereon, including means for preventing rotation of said stud relative to said crank, and link means operatively connecting said lifting crank with the other of said frames.

2. A plow having a frame, a crank axle connected to said frame for vertical swinging and a wheel carried at the end of said crank axle, lifting mechanism associated with said wheel and including a lifting arm having at least two radially spaced apertures, a bearing stud adapted to fit in either of said apertures, optionally, means for rigidly fixing said stud relative to said arm to prevent rotation of said stud with respect to said arm, a link adapted to be journaled on said stud, vertically movable depth adjusting means carried on said frame, and means for operatively connecting said link to said depth adjusting means.

3. In a plow having a frame and a wheel supporting crank axle swingably connected thereto, power operated lifting mechanism including a lifting crank arm mounted on said crank axle, a depth adjusting lever pivoted to said frame, link means connected to said lever, and means for connecting said link means to said crank arm at a point adjacent the outer end thereof when a maximum depth of plowing is desired, and at a second point on said crank arm spaced inwardly from said first point when a minimum depth of plowing is desired, comprising a bearing stud on which said link means is journaled, and means for rigidly fixing said stud on said arm at either of said points, optionally, to prevent rotary and axial movement of said stud relative to said arm.

4. In combination with a crank arm having an aperture formed therein, a link comprising a base plate and a bearing stud fixed perpendicular thereto, said bearing stud being adapted to engage said aperture and extend beyond the opposite side thereof, and means for fixedly securing said base plate to said crank arm.

5. In combination with a crank arm having two similar apertures and a bolt hole spaced along the length thereof, a link comprising a base plate and bearing means fixed perpendicular thereto, said bearing means being adapted to cooperate with either of said apertures at option and said base plate having at least one bolt hole which registers with the first named bolt hole when said bearing means is cooperatively engaged with either of said apertures, and a bolt adapted to be passed through the aligned bolt holes to secure said base plate rigidly against said crank arm.

6. In combination with two members swingably movable relative to one another, one of said members having an aperture formed therein, a link comprising a base plate and bearing means fixed perpendicular thereto, said bearing means being adapted to cooperate with said aperture, means for fixedly securing said base plate against said apertured member, and means for journaling the other of said members on said bearing means.

7. In combination with a crank arm having two similar apertures and a bolt hole spaced along the length thereof, a link comprising a base plate and a bearing stud fixed perpendicular thereto, said bearing stud being adapted to pass through and extend beyond either of said apertures at option and said base plate having a pair of bolt holes formed therein in spaced relation from said bearing stud whereby one of the bolt holes in said base plate is in registration with the bolt hole in said crank arm when said bearing stud is located in either of said apertures, respectively, and a bolt adapted to be passed through the aligned bolt holes to secure said base plate rigidly against said crank arm.

8. An implement comprising, in combination, a frame, a supporting ground wheel connected to said frame for vertical movement, lifting mechanism associated with said wheel including a crank arm having at least two apertures and at least one bolt hole spaced along the length thereof, a link comprising a base plate and bearing means disposed perpendicular thereto, said bearing means being adapted to cooperate with either of said apertures at option and said base plate having at least one bolt hole formed therein in position to register with said first named bolt hole when said bearing means are located in either of said apertures, a bolt adapted to be passed through the aligned bolt holes to secure said base plate rigidly against said crank arm, and link means adapted to be journaled in said bearing means and connected to said frame to transmit to the latter the lifting force exerted by said lifting mechanism.

9. A plow having a frame, a forwardly extending crank axle journaled on said frame for swinging about a transverse axis, a supporting wheel carried at the end of said crank axle, self-interrupting traction operated clutch mechanism associated with said wheel, a lifting arm actuated by said clutch mechanism and having two similar apertures and a bolt hole spaced along the length thereof, a link comprising a base plate and a bearing stud fixed perpendicular thereto, said bearing stud being adapted to pass through and extend beyond either of said apertures at option and said base plate having a pair of bolt holes formed therein in spaced relation from said bearing stud whereby one of the bolt holes in said base plate is in registration with the bolt hole in said lifting arm when the bearing stud is located in either of said apertures, a bolt adapted to be passed through the aligned bolt holes to secure said base plate rigidly against said crank arm, a depth adjusting lever disposed generally above said clutch mechanism and pivotally connected to said frame for vertical swinging, and link means pivotally connected to said depth adjusting lever and journaled on said bearing stud to transmit the force exerted by said lifting mechanism to swing said crank axles downwardly and thereby lift the plow frame.

CARL G. STRANDLUND.